United States Patent [19]

Simpson et al.

[11] Patent Number: 5,869,559

[45] Date of Patent: *Feb. 9, 1999

[54] COMPOSITE PIGMENTARY MATERIAL

[75] Inventors: Leslie Ainsley Simpson, Normanby; Daniel James Rutherford, Yarm; Keith Robson, Whitesmocks; Michael John Trendell, Grays, all of England

[73] Assignee: Tioxide Group Services Limited, London, England

[ * ] Notice: This patent issued on a continued prosecution application filed under 37 CFR 1.53(d), and is subject to the twenty year patent term provisions of 35 U.S.C. 154(a)(2).

[21] Appl. No.: 794,031

[22] Filed: Feb. 3, 1997

[30] Foreign Application Priority Data

Feb. 3, 1995 [GB] United Kingdom ............... 9602221

[51] Int. Cl.$^6$ ..................................................... C08K 3/22
[52] U.S. Cl. .......................................... 524/497; 524/847
[58] Field of Search ..................................... 524/497, 847

[56] References Cited

U.S. PATENT DOCUMENTS

| | | |
|---|---|---|
| 4,025,483 | 5/1977 | Ramig ...................................... 524/497 |
| 4,069,186 | 1/1978 | Ramig ...................................... 524/497 |
| 4,898,892 | 2/1990 | Melber et al. . |
| 4,898,894 | 2/1990 | Melber et al. . |
| 4,912,139 | 3/1990 | Melber et al. . |
| 5,011,862 | 4/1991 | Melber et al. . |
| 5,078,793 | 1/1992 | Caton . |
| 5,152,835 | 10/1992 | Nemeh . |
| 5,344,487 | 9/1994 | Whalen-Shaw ......................... 523/400 |
| 5,454,864 | 10/1995 | Whalen-Shaw ......................... 523/400 |
| 5,464,887 | 11/1995 | Scott ....................................... 524/513 |
| 5,470,893 | 11/1995 | Sinclair Day ........................... 524/513 |

FOREIGN PATENT DOCUMENTS

| | | |
|---|---|---|
| 0 549 163 | 6/1993 | European Pat. Off. . |
| 61-51061 | 3/1986 | Japan . |
| 1 346 491 | 2/1974 | United Kingdom . |
| 1 352 618 | 5/1974 | United Kingdom . |
| 2 102 829 | 2/1983 | United Kingdom . |
| 2 217 334 | 10/1989 | United Kingdom . |
| 2 267 503 | 12/1993 | United Kingdom . |
| 2 293 175 | 3/1996 | United Kingdom . |
| 2 297 758 | 8/1996 | United Kingdom . |
| 2 297 974 | 8/1996 | United Kingdom . |
| 2 298 865 | 9/1996 | United Kingdom . |
| WO 91/01798 | 2/1991 | WIPO . |
| WO 93/11183 | 6/1993 | WIPO . |
| WO 93/12183 | 6/1993 | WIPO . |
| WO 93/12184 | 6/1993 | WIPO . |

*Primary Examiner*—Paul R. Michl

[57] ABSTRACT

A structured composite pigmentary material comprises composite particles consisting of an association of at least one titanium dioxide particle and at least one non-film-forming organic polymer particle wherein the particles are held in association as a result of a positive surface charge on the titanium dioxide particles and a negative surface charge on the polymeric particles, the composition of the composite being such that the ratio by volume of polymeric particles to titanium dioxide particles is in the range 0.3:1 to 0.6:1. An aqueous paint composition and a method of preparing the structured composite pigmentary material are described.

21 Claims, No Drawings

COMPOSITE PIGMENTARY MATERIAL

This invention relates to a composite pigmentary material and in particular to a structured composite pigmentary material comprising particulate titanium dioxide and a particulate organic polymer.

A number of structured composite pigmentary materials have been described recently. These composite materials have been shown to provide improved opacity in surface coatings because, it is believed, the particles of the pigmentary component of the composite material such as titanium dioxide are more uniformly dispersed in the coatings since the particles with which they are associated in the composite material act as spacer particles. In the following description of this invention the phrase "structured composite pigmentary material" is used to describe such a material in which there is a definite association between pigmentary particles and secondary particles. Consequently the secondary particles are more closely associated with the pigmentary particles than they would be in a random mixture and it is believed that this association leads to a more efficient and more structured spacing of the pigmentary particles. One form of structured composite pigmentary material is disclosed in UK Patent Application GB 2 267 503A, in which the component particles are held in association by opposite charges on the surface of the particles.

It has now been surprisingly shown that certain composite materials prepared according to the teachings of GB 2 267 503A can be usefully employed in water based paints which paints have an improved durability compared to conventional paints containing a similar quantity of titanium dioxide.

According to the invention, a structured composite pigmentary material comprises composite particulate material in which the composite particles consist of an association of at least one particle of titanium dioxide and at least one particle of a non-film-forming organic polymer wherein the particles of titanium dioxide carry a positive surface charge and the particles of said organic polymer carry a negative surface charge, the particles of titanium dioxide being held in association with the particles of said organic polymer as a result of said surface charges and in which the composition of the composite particles is such that particles of said organic polymer and particles of titanium dioxide are present in a ratio between 0.3:1 and 0.6:1 expressed as organic polymer to titanium dioxide by volume.

Also according to the invention, an aqueous paint composition comprises an aqueous dispersion of a film-forming organic polymer and a structured composite pigment comprising composite particulate material in which the composite particles consist of an association of at least one particle of titanium dioxide and at least one particle of non-film-forming organic polymer wherein the particles of titanium dioxide carry a positive surface charge and the particles of said non-film-forming organic polymer carry a negative surface charge, the particles of titanium dioxide being held in association with the particles of said non-film-forming organic polymer as a result of said surface charges and in which the composition of the composite particles is such that particles of said non-film-forming organic polymer and particles of titanium dioxide are present in a ratio between 0.3:1 and 0.6:1 expressed as organic polymer to titanium dioxide by volume, said aqueous paint composition having a particulate volume concentration below the critical particulate volume concentration for a dried film of the paint.

The term "pigment volume concentration" is widely used in the paints and coatings industries as a measure of the proportion of a dried paint film, by volume, which consists of pigmentary particles. The term is frequently used as a measure of the proportion of all components in the film which are not derived from the film-forming polymer. Consequently, components which are generally not considered pigmentary, such as extenders and non-pigmentary rigid polymer beads, are included when the pigment volume concentration is calculated. In this invention the more precise term "particulate volume concentration" is used to indicate that the volume being measured is the total volume of all particulate solids including pigments, particles of organic polymer and other inorganic particles such as extender particles.

Further according to the invention a process for producing a structured composite particulate pigmentary material comprises forming an aqueous dispersion of titanium dioxide and an aqueous dispersion of particles of a non-film-forming organic polymer the pH values of the dispersions so formed being such that the particles of titanium dioxide carry a positive surface charge and the particles of organic polymer carry a negative surface charge and mixing said dispersions under conditions such that the mixing does not produce a reversal of the sign of the surface charge on the titanium dioxide or the organic polymer particles, the proportions of titanium dioxide and organic polymer which are mixed being such that the composite pigment formed contains a ratio of organic polymer to titanium dioxide of between 0.3:1 and 0.6:1 by volume.

This process produces an aqueous dispersion of composite pigmentary particles which is convenient for formulating the aqueous paint composition of the invention. It is particularly convenient if this dispersion has a relatively high solids content as this allows for greater flexibility in formulating the paint. Normally, therefore the amount of composite pigmentary material present in such a dispersion is at least 20 per cent by weight. Preferably, the amount of composite is at least 30 per cent by weight and, more preferably, it is at least 40 per cent by weight.

One component of the structured composite pigmentary material of the invention is titanium dioxide. Particulate titanium dioxide is well known as a pigmentary material and, generally, any titanium dioxide suitable for use as a pigment can be used to form the composite pigmentary material of the invention. Usually, the titanium dioxide is prepared by either the so-called "sulphate" route or the so-called "chloride" route and may be in either the rutile or anatase crystal form although the rutile crystal form is preferred.

Rutile titanium dioxide suitable for use in the invention preferably has an average crystal size between 0.2 and 0.3 micrometer and, when used, anatase titanium dioxide preferably has an average crystal size between 0.1 and 0.35 micrometer.

The titanium dioxide may be uncoated but, preferably, the particles are coated with a hydrous inorganic oxide or a phosphate, in a manner commonly used in the production of titanium dioxide pigments. Suitable coatings are formed from, for example, aluminium, silicon, titanium or zirconium oxides or phosphates.

A second component of the structured composite material comprises particles of an organic polymer which is defined as "non-film-forming". This term is to be understood in relation to the final application for which the structured composite is designed. Typically the composite is used in aqueous paints such as the paints which form a further aspect of the invention. Many of the paints according to the invention will be designed to dry at ambient temperatures without the deliberate application of heat but included within the scope of the invention are paint compositions which are designed to be dried by heating. The polymer particles used in the structured composite do not coalesce to form a film under the conditions in which they are used (for example in aqueous paints). When used in paints which are designed to dry at ambient temperatures, the non-film-forming organic polymer particles preferably have a glass transition temperature greater than 30° C. More preferably, the glass transition temperature is greater than 50° C.

The non-film-forming organic polymer particles may comprise solid particles of the polymer but particles which contain vesicles or which are hollow are also suitable. When vesiculated or hollow polymer particles are used they generally contribute to the opacity of a dry paint film due to the presence of air within the particles.

A large number of polymers and copolymers can be used to prepare the non-film-forming organic polymer particles and the person skilled in the art will readily be able to select suitable polymers based on an appropriate glass transition temperature. Polymers and copolymers of ethylenically unsaturated monomers such as styrene, divinyl benzene, butadiene, vinyl chloride, acrylonitrile, acrylic esters such as methyl methacrylate and methyl acrylate, ethylene, propylene and tetrafluoroethylene are suitable as are condensation polymers such as polyesters, polyester amides, polyurethanes and urea-aldehyde resins. The glass transition temperature of the polymeric particles can be increased by introducing cross-links into the polymer.

A range of particle sizes for the non-film-forming organic polymer particles can be employed but, preferably, the average particle size of these particles is between 0.05 and 0.10 micrometer. More preferably, the average particle size is between 0.06 and 0.08 micrometer.

The ratio by volume of the particles of organic polymer to the particles of titanium dioxide in the structured composite pigmentary particles is between 0.3:1 and 0.6:1. Preferably the ratio is between 0.4:1 and 0.6:1 by volume.

One aspect of the invention is a paint composition which contains an aqueous dispersion of a film-forming organic polymer. The term "film-forming polymer" is generally used in the paint and coatings industry to describe a polymer which, when used as a binder in a paint composition, is able to coalesce and form a coherent film under the conditions used to dry an applied paint film. Normally, the paint film is allowed to dry at ambient temperature without additional heat being provided to assist film formation. However, polymers which require heating to promote coalescence and film formation are suitable for use in the composition of this invention. Usually the film-forming organic polymer will have a minimum film-forming temperature (MFFT) as measured according to ASTM D2354 of less than 25° C. Preferably, the MFFT is between 0° C. and 20° C.

Generally, any film-forming organic polymer dispersion which is of use in aqueous paints is suitable for use in the paint compositions of the invention. Frequently the dispersion is in the form of an emulsion and preferred emulsions include emulsions of acrylic polymers, polyvinyl acetate and copolymers such as styrene/butadiene, vinyl acetate/acrylates, styrene acrylics, vinyl acetate/versatate and chlorinated copolymers.

The paint is formulated to have a particulate volume concentration below the critical particulate volume concentration of a dried film of the paint. As is well known in the art of aqueous paints, the critical particulate volume concentration of a paint depends upon the components used in the paint, a particularly relevant factor being the medium demand of the specific particulate materials present in the composition. The critical particulate volume concentration of a paint composition can be readily determined by preparing a number of compositions which vary only in the proportion of particulate material present in a dried film of the paints. Dried films of the paint compositions are tested for their resistance to staining. At the critical particulate volume concentration there is a sudden increase in staining due to the fact that the particles are no longer fully bound by the film-forming polymer and hence the stain can permeate the film.

Normally, the paint compositions of this invention will have a particulate volume concentration below 55 per cent and preferably below 50 per cent. Particulate volume concentration is a measure of the volume of particulate material (titanium dioxide pigment, non film-forming polymeric particles and other particulate material) present in a dried paint film formed from the paint composition. Frequently, the paint compositions of the invention will contain particulate inorganic compounds known as extenders in addition to the structured composite pigment. Suitable extenders are those compounds conventionally used in aqueous emulsion paints such as silica, silicates, aluminates, sulphates, carbonates and clays.

The paint compositions of the invention may also contain particulate pigments such as zinc oxide pigments, antimony oxides, barium pigments, calcium pigments, zirconium pigments, chromium pigments, iron pigments, magnesium pigments, lead pigments, zinc sulphide and lithopone as well as organic pigments. In addition, titanium dioxide and non-film-forming organic polymer particles may be added without prior formation of a structured composite pigment.

A wide range of proportions of particulate materials can be present in the paint compositions of the invention but, generally, the total amount of titanium dioxide pigment present, as composite and otherwise, is sufficient to produce a titanium dioxide pigment volume concentration (pvc) in a dry film of from 5 per cent to 30 per cent and preferably from 10 per cent to 25 per cent, the total amount of non-film-forming polymeric particles present, as composite and otherwise, is sufficient to produce a polymeric particle (or bead) volume concentration (bvc) in a dry paint film of from 1.5 per cent to 40 per cent and preferably from 3 per cent to 35 per cent and the amount of extender present is sufficient to produce an extender volume concentration (evc) in a dry paint film of up to 50 per cent and preferably up to 30 per cent.

Frequently, the paint compositions of the invention will also contain other components conventionally added to aid the formulation of aqueous emulsion paints such as dispersants, antifoaming agents, wetting agents, coalescing solvents and fungicides.

The process according to the invention provides a method for preparing the structured composite pigmentary material of the invention.

The process involves mixing a dispersion of particles of non-film-forming organic polymer with a dispersion of particulate titanium dioxide. Many of the organic polymers useful in this invention are produced by an emulsion polymerisation process in which the end product is a dispersion of polymeric particles. Such dispersions are readily available commercially and are generally useful in this invention provided that the particles thereof bear a negative surface charge. However, it is possible to adjust the surface charge of a commercial dispersion provided that this does not destabilise the dispersion and suitable dispersions of organic polymeric particles can be prepared from dry particulate polymer. Where dispersions are produced from dry polymer it is essential to ensure that the dispersed particles carry a negative surface charge by, for example, using an anionic dispersing agent or appropriately adjusting the pH of the dispersion.

The titanium dioxide dispersion may be prepared by any suitable means. Most preferably the titanium dioxide is stirred with water in the absence of a dispersing agent but it is often convenient to utilise a dispersion which is an intermediate product in the preparation of pigmentary titanium dioxide and such dispersions frequently contain dispersing agents. The presence of these dispersing agents usually does not prevent the use of such dispersions in the process of the invention.

Preferably the dispersion of titanium dioxide is subjected to a milling step to break down any aggregates present and to optimise the degree of dispersion of the particles. The milling can be carried out by, for example, high speed impeller mill, ball mill, sand mill or the use of ultrasound.

The pH value of the dispersion of titanium dioxide is chosen so that the surface of the particles carries a positive charge. Consequently, the pH value of the dispersion is below the isoelectric point for the titanium dioxide but the actual pH value chosen will depend upon the nature of the surface of the particles. For example, titanium dioxide particles having a coating of alumina will carry a substantial positive charge when dispersed at a pH below about 6 whereas the surface charge on titanium dioxide particles having a coating containing silica will be substantially positive below a pH of about 2.

The titanium dioxide dispersion is mixed with the dispersion of organic polymeric particles and, in order to simplify this mixing step, it is preferable that the dispersion of organic polymer has a pH value substantially similar to the value chosen for the titanium dioxide dispersion. Preferably, the two dispersions have pH values which differ by not more than 1 pH unit. More preferably the difference is not more than 0.5 pH unit.

When the pH values of the two dispersions are substantially similar the product of the invention is readily prepared by mixing these two dispersions whilst the mixture is agitated by any suitable means. Adequate mixing of the two dispersions is effected, for example, by stirring, recirculatory mixing, or by exposing the mixture to the effect of ultrasonic vibrations. Typically, one of the dispersions is added to the other dispersion slowly, or the two dispersions are simultaneously introduced into an agitated mixing zone.

It may be necessary, for example when the dispersion of non-film-forming organic polymer has a poor stability at a pH value chosen for mixing, to prepare the two dispersions at substantially different pH values. When it is necessary to employ dispersions having substantially different pH values it is important to mix the dispersions under conditions such that the sign of the surface charge on either of the particulate materials is not reversed by any changes in pH which may occur during mixing. For example, it may be necessary to add an acid or a base to adjust the pH during the mixing.

For example, a suitable pH value for producing a composite from alumina-coated titanium dioxide is about 4 to 5. However, commercially available polymer particles are often supplied as a dispersion at a pH of about 7 to 9. Nevertheless, a product according to this invention can be formed from titanium dioxide and polymeric particles by adding a commercial dispersion of polymeric particles to a dispersion of titanium dioxide at a pH of 4 to 5 whilst the pH of the resultant mixture is maintained in the range 4 to 5 by the simultaneous addition of an acid.

In view of the need to utilise a dispersion of titanium dioxide in which the particles carry a positive surface charge, the pH value chosen for the titanium dioxide dispersion will normally be less than 7. Frequently, therefore, the dispersion of composite pigmentary particles which is the direct product of the process of the invention has a pH value less than 7. Typically, this dispersion will have a pH value in the range 4 to 5. Many aqueous paints are formulated with a pH value above 7 and, consequently, to aid paint preparation, the pH value of the dispersion of composite pigment is often adjusted after preparation to a value above 7. Usually, the pH is adjusted to a value in the range 7 to 9.

The composite pigmentary material of the invention is particularly useful in high quality emulsion paints designed to be durable. The structured nature of the material enables the preparation of paints having an improved opacity in comparison to paints containing a similar quantity of titanium dioxide but prepared using conventional formulation techniques. It has also been surprisingly discovered that paints containing the structured composite of the invention have a better durability than conventional paints containing the same amount of titanium dioxide. Thus the composite pigmentary material of the invention provides an economical means of enhancing opacity and durability of aqueous paint compositions.

The invention is illustrated by the following example.

EXAMPLE 773.2 g of titanium dioxide pigment sold under the Trade Name TIOXIDE TR92 was dispersed using a high speed dispersion mill, in 479.8 g of water having a pH of 4.5 and dilute hydrochloric acid was added to maintain the pH at 4.5. A commercially available aqueous dispersion of polystyrene beads (49.3% solids by weight) stabilised with an anionic dispersing agent and having an average particle size of 100 nm was adjusted to a pH of 4.5. 200 g of this dispersion was mixed with the titanium dioxide dispersion by simultaneously pouring the two dispersions into a beaker and gently agitating the mixture. After mixing, the product was stirred for a further 5 minutes using a saw tooth impeller stirrer operating at low speed. The pH was raised to 8.5 with dilute ammonium hydroxide which was added whilst the dispersion was stirred with a spatula and the product was finally mixed, to ensure homogeneity, with a low speed agitator. Analysis showed the product to be a structured composite pigment with a ratio of polystyrene particles to pigment particles of 0.48 to 1 by volume.

The structured composite pigment was used to prepare an aqueous paint having the formulation shown below. A control paint was also prepared which contained the same amount of titanium dioxide but not in the form of a structured composite pigment. The paint formulation is shown below.

All the ingredients apart from the pigments, extenders and emulsion were milled together with 117 parts water and this milling solution was subsequently mixed by stirring with the pigments, extenders, emulsion and the remaining water.

PAINT FORMULATION

| | Paints by weight | |
|---|---|---|
| | CONTROL | TEST |
| Water | 311.0 | 222.2 |
| Hydroxyethylcellulose (Cellosize QP4400) | 4.0 | 4.0 |
| Ammonia (0.88) | 2.3 | 2.3 |
| Sodium salt of polycarboxylic acid (Dispex N40) | 3.0 | 3.0 |
| Nonionic surfactant (Triton CF10) | 0.2 | 0.2 |

-continued

PAINT FORMULATION

|  | Paints by weight | |
| --- | --- | --- |
|  | CONTROL | TEST |
| Coalescing solvent (Texanol) | 11.0 | 11.0 |
| Defoaming agent (Foamaster E75C) | 0.8 | 0.8 |
| Biocide (Acticide BX) | 0.8 | 0.8 |
| Extender (Snowcal 60) | 64.0 | 54.6 |
| Extender (Polestar 200P) | 42.7 | 36.4 |
| Titanium dioxide (Tioxide TR92) | 158.0 | — |
| Composite material of Example 1 | — | 329.0 |
| Vinyl acetate/Veova 10 emulsion (Vinamul 6955) | 204.0 | 204.0 |

PAINT PROPERTIES

|  | CONTROL | TEST |
| --- | --- | --- |
| % Solids by volume | 30.0 | 30.0 |
| $TiO_2$ volume concentration | 22.0 | 22.0 |
| Extender volume concentration | 23.0 | 17.7 |
| Bead volume concentration | 0.0 | 10.5 |
| Total particulate volume concentration | 45.0 | 50.2 |

The paints were applied by brushing onto degreased 6 inch×2.5 inch stainless steel panels. Three coats were applied, allowing at least 16 hours to dry between coats. The final painted panels were allowed to dry for 7 days at room temperature before exposure. The dried paint films were tested for durability, i.e. colour retention and 'chalk' resistance, in three artificial weathering machines, a XENOTEST 1200 (Xenon arc), a MARR twin carbon arc and a QUV (UVA tubes) machine.

Initial CIE Lab measurements of brightness (L* value) and tone (b* value) were recorded.

At intervals the panels were removed from the weathering machines, allowed to dry and CIE Lab measurements were repeated. The results are shown below.

In addition, at each interval, a measurement of chalk resistance was made. A strip of black cloth was drawn down the length of each paint film using an even pressure with the index finger. Surface chalk is transferred to the cloth in the form of a white disc. The degree of 'chalk' resistance was assessed in accordance with ASTM D659, using a scale of 0 to 10, where 10 represents no 'chalking' and 0 represents severe 'chalking'. The onset of 'chalking' and the final 'chalk' measurements are shown below.

XENOTEST

|  | L* VALUES | | b* VALUES | |
| --- | --- | --- | --- | --- |
| HOURS | CONTROL | TEST | CONTROL | TEST |
| 0 | 97.2 | 97.4 | 1.8 | 1.7 |
| 120 | 96.3 | 96.7 | 2.9 | 2.4 |
| 236 | 96.1 | 96.6 | 3.2 | 2.7 |
| 366 | 95.7 | 96.5 | 3.7 | 2.8 |
| 504 | 95.8 | 96.3 | 4.0 | 3.2 |
| 599 | 95.5 | 96.0 | 4.4 | 3.5 |
| 718 | 95.5 | 96.0 | 4.4 | 3.7 |
| 1006 | 95.2 | 95.8 | 5.0 | 4.0 |
| 1114 | 95.3 | 96.0 | 4.7 | 4.0 |
| 1327 | 95.4 | 95.9 | 4.7 | 3.9 |
| 1545 | 95.1 | 95.9 | 5.5 | 4.4 |
| 1961 | 95.4 | 96.1 | 4.1 | 3.2 |

On completion of test—no 'chalking' on either of the paint films, i.e. all 'chalk' ratings=10

MARR

|  | L* VALUES | | b* VALUES | |
| --- | --- | --- | --- | --- |
| HOURS | CONTROL | TEST | CONTROL | TEST |
| 0 | 97.2 | 97.4 | 1.8 | 1.7 |
| 110 | 95.8 | 96.6 | 2.6 | 2.5 |
| 200 | 95.5 | 96.4 | 2.9 | 2.8 |
| 295 | 95.1 | 96.2 | 3.4 | 3.2 |
| 450 | 95.0 | 96.2 | 3.9 | 3.5 |
| 601 | 94.5 | 96.1 | 4.8 | 3.6 |
| 800 | 94.1 | 95.9 | 5.4 | 3.9 |
| 1021 | 93.9 | 96.0 | 5.8 | 3.8 |
| 1292 | 93.9 | 96.2 | 6.0 | 3.8 |
| 1420 | 93.8 | 96.2 | 6.1 | 3.8 |
| 1684 | 93.8 | 96.4 | 5.7 | 3.7 |
| 1903 | 93.7 | 96.1 | 5.7 | 3.5 |
| 2091 | 93.7 | 96.1 | 5.3 | 3.6 |

Onset of 'chalking' for both paints=1684 hours.
Final 'chalk resistance' ratings for both paints=8

OUV

|  | L* VALUES | | b* VALUES | |
| --- | --- | --- | --- | --- |
| HOURS | CONTROL | TEST | CONTROL | TEST |
| 0 | 95.9 | 96.6 | 1.9 | 1.7 |
| 118 | 95.5 | 96.3 | 2.1 | 1.9 |
| 211 | 95.6 | 96.1 | 2.2 | 2.1 |
| 313 | 95.4 | 95.9 | 2.3 | 2.3 |
| 409 | 95.5 | 95.9 | 2.6 | 2.2 |
| 552 | 95.3 | 95.9 | 2.7 | 2.3 |
| 808 | 95.4 | 95.8 | 2.8 | 2.5 |
| 951 | 95.4 | 95.7 | 2.8 | 2.6 |
| 1047 | 94.8 | 95.8 | 2.7 | 2.7 |
| 1212 | 95.1 | 95.6 | 2.9 | 2.6 |
| 1397 | 94.9 | 95.5 | 3.1 | 2.8 |
| 1806 | 94.8 | 95.5 | 3.5 | 2.9 |
| 1990 | 94.9 | 95.5 | 3.4 | 2.9 |
| 2201 | 94.7 | 95.6 | 3.4 | 3.0 |

On completion of test—no 'chalking' in either of the paint films, i.e. all 'chalk' ratings=10

The results show that although 'chalk' results are similar for both paints, in all cases colour retention of the test paint is significantly better than the control paint.

We claim:

1. A structured composite pigmentary material comprising composite particulate material in which the composite particles are of an association of at least one particle of titanium dioxide and at least one particle of a non-film-forming organic polymer wherein the particles of titanium dioxide carry a positive surface charge and the particles of said organic polymer carry a negative surface charge, the particles of titanium dioxide being held in association with the particles of said organic polymer as a result of said surface charges and in which the composition of the composite particles is such that particles of said organic polymer and particles of titanium dioxide are present in a ratio between 0.3:1 and 0.6:1 expressed as organic polymer to titanium dioxide by volume and in which the positive charge on the titanium dioxide is generated by forming an aqueous dispersion of the titanium dioxide in the substantial absence of a dispersing agent and at a pH value which produces said positive charge.

2. A structured composite pigmentary material according to claim 1 in which the titanium dioxide is in the rutile crystal form and has an average crystal size between 0.2 and 0.3 micrometer.

3. A structured composite pigmentary material according to claim 1 in which the titanium dioxide is in the anatase crystal form and has an average crystal size between 0.1 and 0.3 micrometer.

4. A structured composite pigmentary material according to claim 1 in which the titanium dioxide particles are coated with a hydrous inorganic oxide or a phosphate.

5. A structured composite pigmentary material according to claim 1 in which the non-film-forming organic polymer has a glass transition temperature greater than 30° C.

6. A structured composite pigmentary material according to claim 1 in which the particles of non-film-forming polymer contain vesicles or are hollow.

7. A structured composite pigmentary material according to claim 1 in which the non-film-forming polymer is cross-linked.

8. A structured composite pigmentary material according to claim 1 in which the particles of non-film-forming organic polymer have an average particle size between 0.05 and 0.10 micrometer.

9. A structured composite pigmentary material according to claim 1 in the form of an aqueous dispersion containing at least 20 per cent by weight of the composite material.

10. An aqueous paint composition comprising an aqueous dispersion of a film-forming organic polymer and a structured composite pigment comprising composite particulate material in which the composite particles are of an association of at least one particle of titanium dioxide and at least one particle of non-film-forming organic polymer wherein the particles of titanium dioxide carry a positive surface charge and the particles of said non-film-forming organic polymer carry a negative surface charge, the particles of titanium dioxide being held in association with the particles of said non-film-forming organic polymer as a result of said surface charges and in which the composition of the composite particles is such that particles of said non-film-forming organic polymer and particles of titanium dioxide are present in ratio between 0.3:1 and 0.6:1 expressed as polymer to titanium dioxide by volume, said aqueous paint composition having a particulate volume concentration below the critical particulate volume concentration for a dried film of the paint and in which the positive charge on the titanium dioxide is generated by forming an aqueous dispersion of the titanium dioxide in the substantial absence of a dispersing agent at a pH value which produces said positive charge.

11. An aqueous paint composition according to claim 10 in which the film-forming organic polymer has a minimum film-forming temperature less than 25° C.

12. An aqueous paint composition according to claim 10 having a particulate volume concentration below 55 per cent.

13. An aqueous paint composition according to claim 10 further comprising an extender selected from the group consisting of silica, silicates, aluminates, sulphates, carbonates and clays.

14. An aqueous paint composition according to claim 10 further comprising particulate pigments selected from the group consisting of zinc oxide pigments, antimony oxides, barium pigments, calcium pigments, zirconium pigments, chromium pigments, iron pigments, magnesium pigments, lead pigments, zinc sulphide, lithopone and organic pigments.

15. An aqueous paint composition according to claim 10 having a titanium dioxide pigment volume concentration in a dry paint film in the range 5 per cent to 30 per cent.

16. An aqueous paint composition according to claim 10 having a polymeric particle volume concentration in a dry paint film of from 1.5 per cent to 40 per cent.

17. An aqueous paint composition according to claim 10 having an extender volume concentration in a dry paint film up to 50 per cent.

18. A process for producing a structured composite particulate pigmentary material comprising forming an aqueous dispersion of titanium dioxide and an aqueous dispersion of particles of a non-film-forming organic polymer the pH values of the dispersions so formed being such that the particles of titanium dioxide carry a positive surface-charge and the particles of organic polymer carry a negative surface charge and mixing said dispersions under conditions such that the mixing does not produce a reversal of the sign of the surface charge on the titanium dioxide or the organic polymer particles, and in which the positive charge on the titanium dioxide is generated by forming an aqueous dispersion of the titanium dioxide in the substantial absence of a dispersing agent and at a pH value which produces said positive charge, the proportions of titanium dioxide and organic polymer which are mixed being such that the composite pigment formed contains a ratio of organic polymer to titanium dioxide of between 0.3:1 and 0.6:1 by volume.

19. A process according to claim 18 in which the pH value of the dispersion of titanium dioxide and the pH value of the dispersion of non-film-forming organic polymeric particle do not differ by more than 1 pH unit.

20. A process according to claim 18 in which a dispersion of alumina-coated titanium dioxide is formed at a pH in the range 4 to 5, a dispersion of non-film forming organic polymer having a pH in the range 7 to 9 is added and the resultant mixture is maintained at a pH in the range 4 to 5 by the simultaneous addition of acid.

21. A process according to claim 18 in which the structured composite particulate pigmentary material is formed at a pH below 7 and the pH of the product is subsequently adjusted to a value above 7.

* * * * *